July 14, 1942.  E. G. KESLING  2,289,655
GEAR SHIFTING MECHANISM
Original Filed March 14, 1938  3 Sheets-Sheet 1
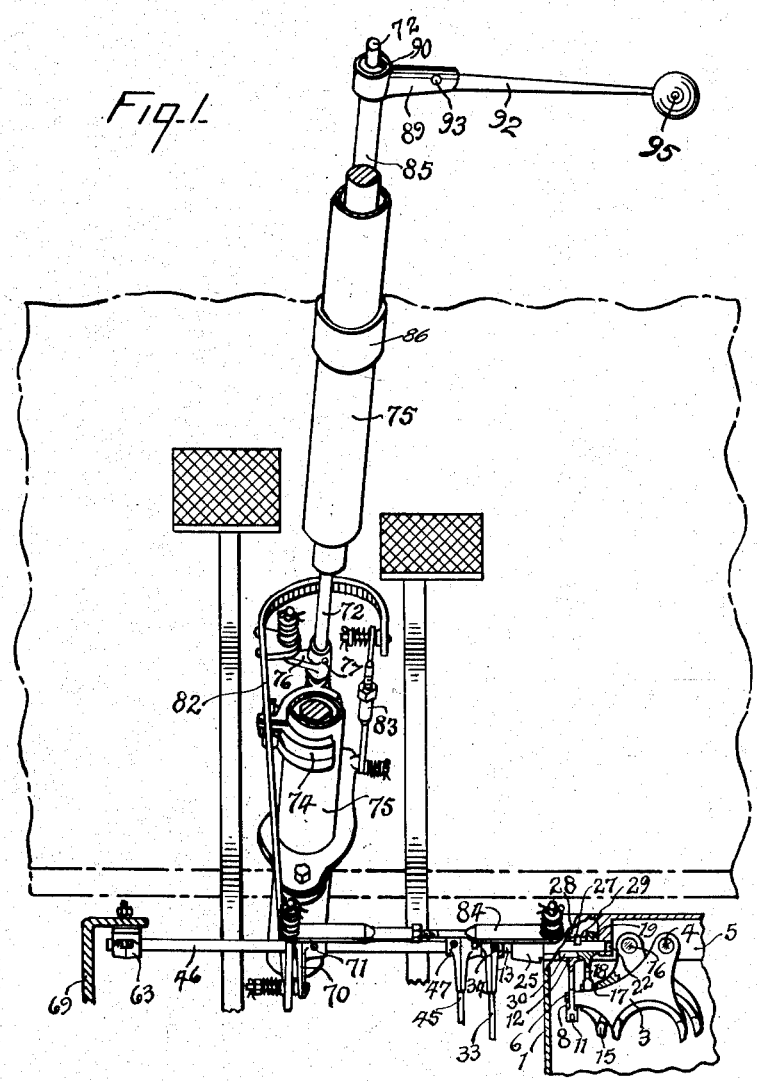
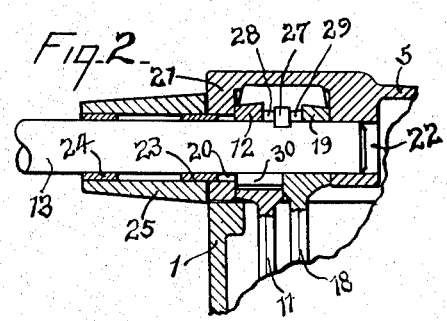
Inventor
Elmer G. Kesling
by John D. Rippey
His Attorney

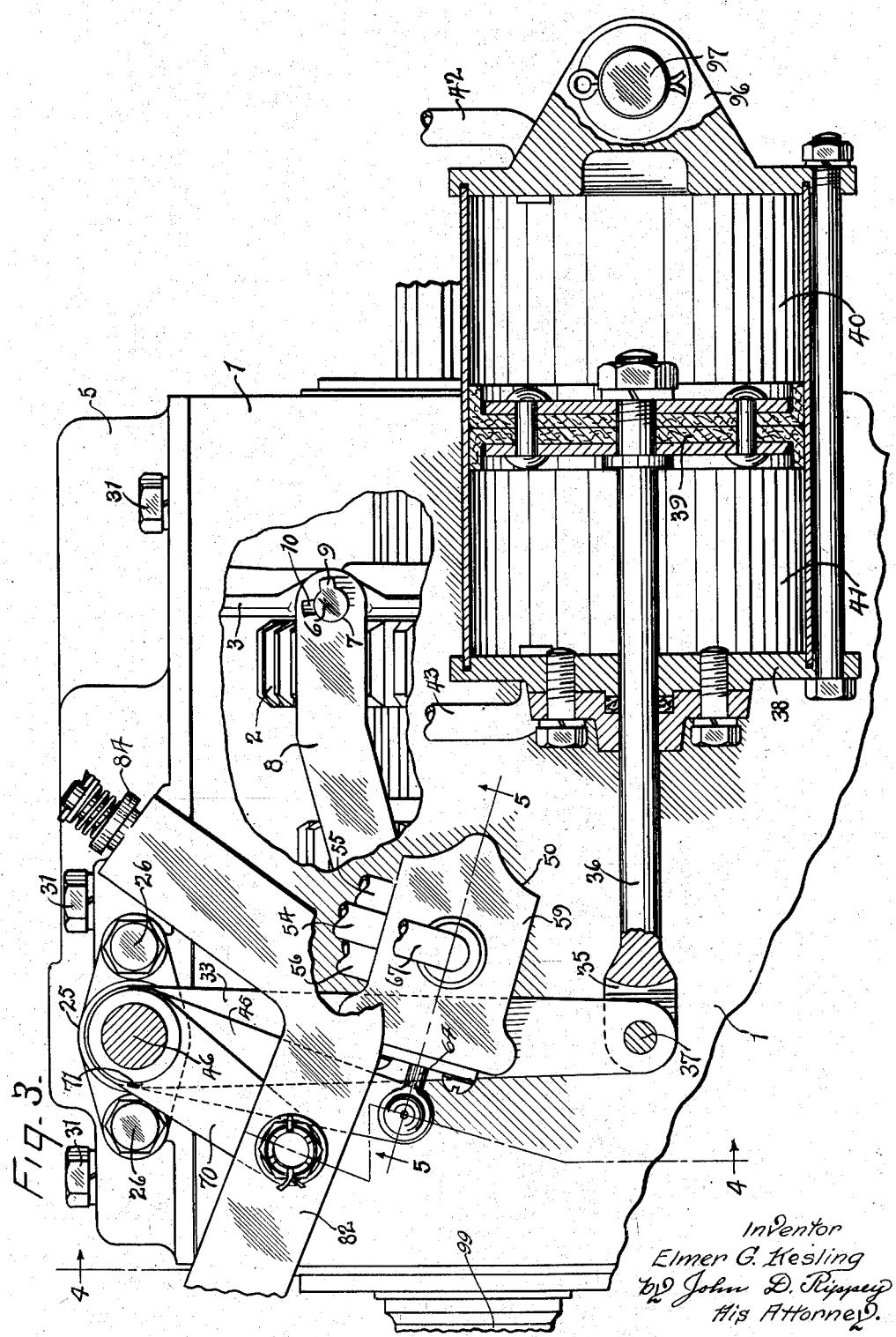

July 14, 1942.  E. G. KESLING  2,289,655
GEAR SHIFTING MECHANISM
Original Filed March 14, 1938    3 Sheets-Sheet 3
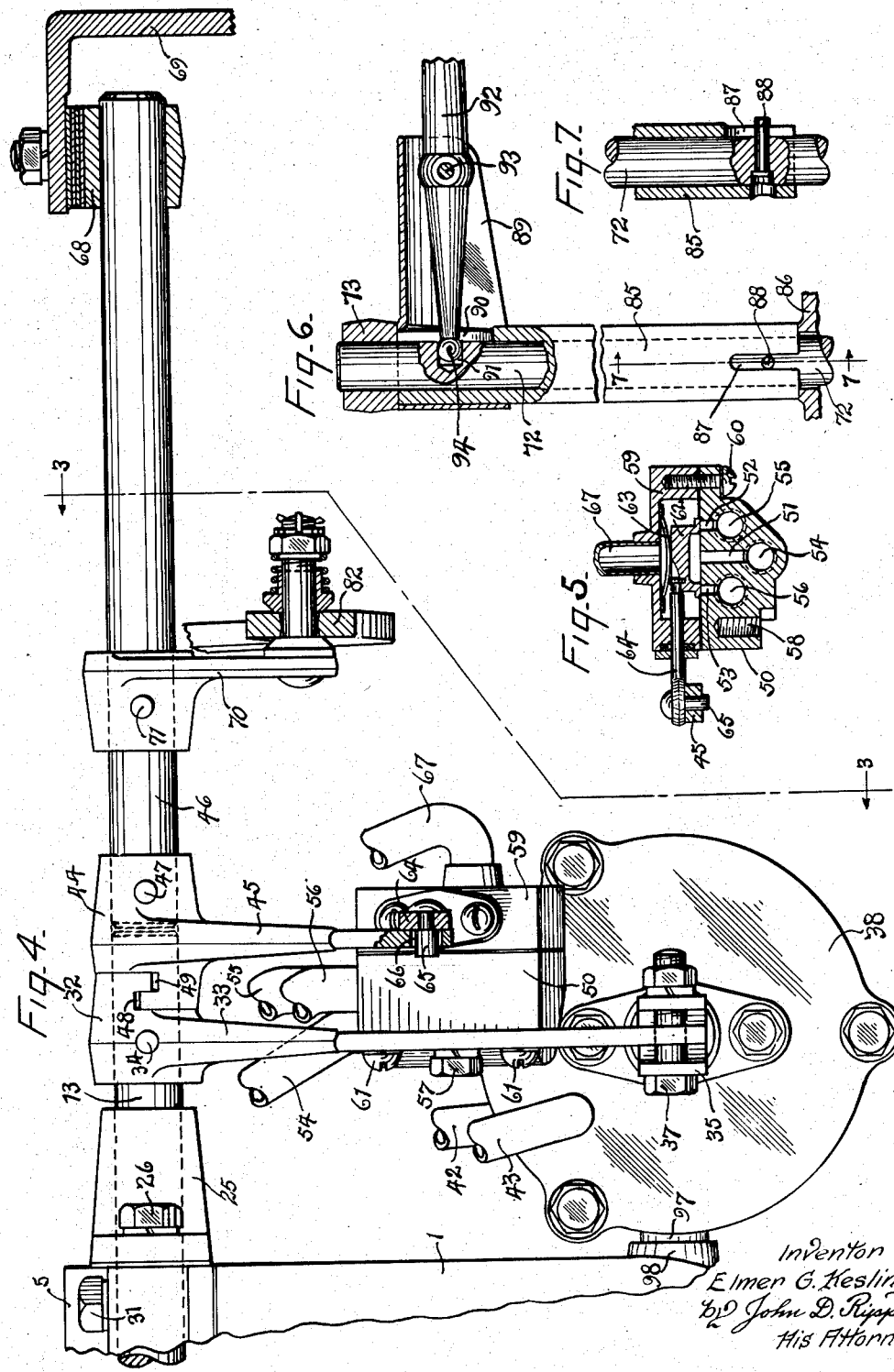
Inventor
Elmer G. Kesling
by John D. Rippey
His Attorney Patented July 14, 1942

2,289,655

UNITED STATES PATENT OFFICE 2,289,655

GEAR SHIFTING MECHANISM

Elmer G. Kesling, Bloomfield, Mo.

Original application March 14, 1938, Serial No. 195,865. Divided and this application December 30, 1939, Serial No. 311,896

32 Claims. (Cl. 74—335)

This invention relates to gear shifting mechanism for use in automobiles and other vehicles; and has special reference to that type of gear shifting mechanism in which an operating shaft and an actuating spindle therefor are both mounted for longitudinal and turning movements and have a manually operated lever for operating said shaft, and shifter elements selectively shiftable by said spindle.

The invention relates more particularly to the construction and arrangement of the means operatively connecting said lever to said shaft, and the construction and assemblage of said shifter element parts, and includes a power device for assisting the manual means in effecting the shifting movements.

The required rockable and longitudinally movable shaft and spindle are used in a number of my inventions; and they are operatively connected in different ways in the different inventions.

In this invention I have elected to show the improvement in combination with the construction shown in my Patent No. 1,877,886, granted September 20, 1932, in which a link and lever element is used to operatively connect the shaft and spindle.

Objects of the invention are to provide mechanism that may be used interchangeably with the old conventional floor lever shift on the same transmission case, to provide mechanism having a manually operated remote control in conjunction with which a power assisting means for effecting the shifting movements may or may not be used as desired; to provide mechanism easy of operation and having the operating means conveniently placed in reach of the operator; to provide mechanism easily installed on the automobile and requiring a minimum of change of the other parts of the car; to provide mechanism for attaching the manual operating lever to the operating shaft that is simple of construction and easy to assemble; and to provide means whereby the selective shifting arms may be easily assembled in the case cover.

Other objects will be apparent from the following description, reference being made to the accompanying drawings, in which—

Fig. 1 is a rear elevation of the parts of the speed control mechanism of an automobile having my invention combined therewith, parts being broken away and other parts in section.

Fig. 2 is an enlarged view of that portion of Fig. 1 comprising the connection of the device with the gear case.

Fig. 3 is an enlarged side elevation with parts in section, approximately on the line 3—3 of Fig. 4, showing the connection of the manual means and the power means with the elements of the shifting mechanism controlled thereby.

Fig. 4 is a sectional view on the irregular section line 4—4 of Fig. 3.

Fig. 5 is a sectional view of the valve mechanism on the line 5—5 of Fig. 3.

Fig. 6 is an enlarged view with parts in section of the operating lever and associated parts shown in elevation in Fig. 1.

Fig. 7 is a vertical sectional view on the line 7—7 of Fig. 6.

This is a division of my prior application Serial No. 195,865, filed March 14, 1938, for Gear shifting mechanism.

The case 1 encloses the customary transmission gearing. The present invention is not concerned with the construction of the gearing that is within the case 1, except that it is to be understood that they are of the shifter element type for effecting the different speed relations.

In the showing of the drawings, the low and reverse speed relations are effected through the sliding gear 2 which is moved by the low and reverse yoke 3 supported by the customary shift rail 4 mounted for longitudinal movements in a case cover 5.

A bearing pin 6 is formed on one side of the yoke 3 for pivotal attachment in a hole 7 in one end of a link 8. A lug 9 is formed on one side of the outer end of the pin 6. A notch 10 is formed in the link 8 at one side of the hole 7. The lug 9 and the notch 10 are so placed that the lug 9 will pass through the notch 10 when the link 8 is turned in an abnormal relation with respect to the yoke 3, and the lug 9 will prevent the link 8 from coming off of the pin 6 when placed thereon and then turned to the normal relation with respect to the yoke 3 (Fig. 3). The other end of the link 8 is pivotally attached to the lower end of a crank arm 11. The other end of the arm 11 has a hub 12 formed thereon which is loosely mounted on a rockable and longitudinally movable spindle 13.

In the showing of the drawings, the second and high speed relations are effected through the synchronizer (not shown) which is moved by the second and high yoke 15 supported by the customary shift rail 16 mounted for longitudinal movements in the case cover 5, as disclosed in my said application Serial No. 195,865. A notch 17 is formed on one side of the yoke 15 and is directly engaged by the lower end of a crank arm 18. The other end of the arm 18 has a hub 19 formed thereon which is loosely mounted on the spindle 13.

The spindle 13 extends through a hole 20 in a side 21 of the cover 5 and is supported in a bearing 22 depending from the upper wall of the cover 5 and in bushings 23 and 24 in a projection 25 secured to the cover 5 by bolts 26. The inner end of the bushing 23 extends beyond the projection 25 and fits into the hole 20 for alinement purposes.

The hubs 12 and 19 are mounted on the spindle 13 between the wall 21 and the bearing 22 and are held from longitudinal movement with said spindle 13 by said wall 21 and bearing 22. A lug 27 is formed on the spindle 13, and by longitudinal movements of the spindle 13 may be brought into engagement with either of the notches 28 or 29 formed in the adjacent faces of the respective hubs 12 and 19 (Fig. 2). Thus it will be seen that longitudinal movements of the spindle 13 will selectively engage the hub 12 or 19, and rotative movements of the spindle 13 will swing the respective arm 11 or 18, as the case may be.

The depth of the notches 28 and 29 and the thickness of the lug 27 controls the extent of the longitudinal movements of the spindle 13, and these depths and this thickness are in such proportion that when the lug 27 is entirely in one of the notches 28 or 29 it will be entirely out of the other notch 28 or 29, as the case may be. The lug 27 may be made integral with the spindle 13 or secured thereto in any manner. The hole 20 is large enough to permit the passage therethrough of the spindle 13 and the lug 27 when the lug 27 is made integral with or secured to said spindle 13. A notch 30 is formed through the hub 12, and the notch 30 is of such size to allow the passage of the lug 27 through the hub 12. In assembling the arms it will then be seen that if the arm 11 is turned backward and the arm 18 turned forward in the cover 5 until the notches 20 and 30 are in alinement, the spindle 13 and lug 27 may be passed through the hole 20 and the hub 12 and into the hub 19 and bearing 22 until the lug 27 is in the notch 29; whereupon the arms 11 and 18 may both be turned downwardly to normal position and the assemblage is completed by putting the projection 25 in place over the outer end of the spindle 13 and placing the bolts 26, positioning the yokes 3 and 15, inserting the rails 4 and 16 and securing the respective yokes thereto. The case cover 5 is secured to the case by bolts 31 which may be inserted in the same holes in the case as the bolts for securing the case cover containing the customary floor lever shift.

The spindle 13 projects beyond the outer end of the projection 25 and has the hub 32 of a crank arm 33 secured thereto by a pin 34. The free end of the arm 33 is pivotally connected to the forked end 35 of a piston rod 36 by a bolt 37. The space between the sides of the forked end 35 is sufficient to allow the lever 33 to slide along the bolt 37 as said lever is moved with the longitudinal movements of the spindle 13 (Fig. 4). The piston rod 36 extends into a cylinder 38 and is connected to a piston 39 which divides the cylinder 38 into two compartments 40 and 41 which have tubes 42 and 43 respectively communicating therewith. The spindle 13 projects beyond the end of the hub 32 and into pivotal engagement with a hub 44 of an arm 45 to support said arm. The hub 44 is secured to the abutting end of a second spindle 46 by a pin 47. Interlocking notches 48 and 49 are cut in the adjacent ends of the respective hubs 32 and 44. The notches 48 and 49 are of such depth as to allow a certain amount of free relative swinging movements of the arms 33 and 45, and to hold said hubs in end-to-end relation.

A device 50 having port holes 51, 52 and 53 formed therein with tubes 54, 55 and 56 respectively communicating therewith is secured to the arm 33 by a bolt 57 engaging in a hole 58 in said device 50. A cover 59 is secured to the device 50 by screws 60 and 61. The cover 59 houses a slide valve 62 (Fig. 5) which is resiliently held in place by a spring 63, and which is pivotally connected to one end of a rod 64 which extends through a wall of the cover 59 and has a pin 65 secured in the end thereof. The pin 65 extends in a slot 66 (Fig. 4) in the free end of the arm 45. It is clearly seen that a turning movement of the spindle 46 will first swing the arm 45 and move the valve 62 by the rod 64 and open one or the other of the ports 52 or 53 as the case may be and that in case there is no other force for swinging the arm 33, a continued turning movement of the spindle 46 will turn the hub 32 and spindle 13 as soon as the free movement allowed by the notches 48 and 49 is taken up, and that if another force should move the arm 33 the ports 52 or 53 will overrun the valve 62 and become closed unless the spindle 46 should continue to be moved to keep the port 52 or 53, as the case may be, open.

The interlocking notches 48 and 49 cause both of the spindles 13 and 46 to move together longitudinally. Since the spindles 13 and 46 both have similar movements and functions at times, they might at such times be regarded as a single spindle 13—46.

A tube 67 communicates with the inside of the cover 59. Either pressure or vacuum fluid energy may be used as an operative medium for the power means. It will be understood that rubber tubing or other flexible means (not shown) is to be used to transmit the fluid energy. Such means would connect the tube 54 to an exhaust means (not shown) if a pressure medium is to be used, or to the engine intake manifold (not shown) if vacuum air is to be used; the tube 55 to the tube 42; the tube 56 to the tube 43; and the tube 67 to a pressure device (not shown) if a pressure medium is to be used, or to the carburetor air cleaner (not shown) if vacuum air is to be used. This connecting means must be flexible, because the device 50 is secured to the arm 33 and moves therewith, and the cylinder 38 has a slight pivotal movement also on the support 97.

The end of the spindle 46 opposite the hub 44 is supported by an adjustable bracket 68 secured to some stationary part 69 of the automobile. A crank arm 70 is secured to the spindle 46 by a pin 71 (Fig. 4). A shaft 72 is mounted for longitudinal and turning movements in supports 73 and 74 which are secured to some stationary part of the automobile, preferably to the steering column 75, as shown (Figs. 1 and 6). A crank arm 76 is secured to the shaft 72 by a pin 77, or may be secured in any other desirable manner.

An operating link 82 is pivotally connected to the crank arms 70 and 76. Swinging abutments 83 and 84 each having one end pivotally secured to the link 82 and the other end pivotally secured to a convenient stationary part of the automobile are provided as fulcrums upon which the link is made to turn or oscillate in transmitting longitudinal movements to the spindle 46—13 by longitudinal movements of the shaft 72. A tubular member 85 is supported on the shaft 72 for rotative movements only between the support 73 and the bracket 86 which secures the steering column 75 to the instrument panel (not shown). A longitudinal slot 87 is provided in a wall of the member 85, and a pin 88 is mounted in a hole through the shaft 72 and extends through the slot 87. From this construction it will be seen that the member 85 cannot move longitudinally on account of abutment with the support 73 and the bracket 86, that the shaft 72 may be moved longitudinally without interference since the pin 88 may move along the slot 87, but that the member 85 cannot be rotated without turning the shaft 72 therewith on account of the pin 88 engaging the side walls of the slot 87. A U-shaped fulcrum extension 89 projects substantially at right angles from one side of the member 85 and is secured to the member 85 by welding or otherwise. A longitudinal slot 90 is formed through the wall of the member 85 under and in line with the U-shaped extension 89. A hole 91 is bored in the substance of the shaft 72 adjacent to the slot 90 and substantially in line with the center of the U-shaped extension. An operating lever 92 is pivotally secured in the other end of the U-shaped extension by a bolt or pin 93. The lever 92 extends inwardly in the U-shaped extension through the slot 90 and terminates in a ball formation 94, and the lever 92 extends outwardly to a proper operating length and terminates in an operating ball or other formation 95.

It can now be understood that swinging of the operating lever on the pin 93 will cause longitudinal movements of the shaft 72 as the ball 94 engages the wall of the hole 91 and that swinging of the lever in the opposite plane will cause turning movements of the shaft 72 through the action of the extension 89, member 85, slot 87 and pin 88. It can be further seen that longitudinal movements of the shaft 72 will rotate or oscillate the link 82 and move the spindle 46—13 longitudinally through the arms 76 and 70 and their respective connections with the link 82 on account of the offset positions of the fulcrum links 83 and 84.

The cylinder 38 is supported in a pivotal manner in order to accommodate the swinging action of the lever 33. In the showing of the drawings, this support is in the form of a projection 96 on the end of the cylinder 38 opposite the piston rod 36. The projection 96 is pivotally mounted on a rod 97 which is supported on or by some stationary part of the automobile as by the part 98 shown in Fig. 4.

In the operation of the device, the operating lever 92 is swung on the fulcrum pin 93 to produce a positioning of the lug 27 in either the slot 28 or the slot 29 as the case may be through the action of the parts 94, 91, 72, 76, 82, 83, 84, 70, 46 (49 and 48), and 13. When the lever 92 is lowered these parts act in one direction to position the lug 27, in the notch 28 which is the selected position for shifting into reverse or low speed positions; and when the lever 92 is raised these parts act in the opposite direction to position the lug 27 in the notch 29, which is the selected position for shifting into second and high speed positions.

After the required selection has been made, the lever 92 is swung in the horizontal plane to effect the required shift through the action of the parts 89, 85, 88, 72, 76, 82, 70, 46, 45, 66, 65, 64, 50, the proper tubing, the parts 38, 39, 36, 37, 33, 13 and 27, and the selected notch and respective lever 15 or 18, as the case may be.

Therefore, if it is desired to selectively shift into either reverse or low speed, the lever 92 is lowered, and, since the lever 92 fulcrums in this plane of movement on the pin 93 in the projection 89 which is rigid with the member 85 which is held against longitudinal movements by the stationary parts 73 and 86, and also since the lever 92 is extended beyond the fulcrum pin 93 to engage the shaft 72 by the ball end 94 in the hole 91, the shaft 72 is made to move longitudinally upwards; whereupon the arm 76 oscillates the link 82 on the offset fulcrum 83 and the oscillating link 82 fulcruming on the part 84 acts on the crank 70 to move the spindles 46 and 13 longitudinally in the direction to cause the lug 27 to selectively engage the notch 28; then, if the shift to effect reverse speed is desired, the lever 92 is swung forward and causes the projection 89 to swing therewith and rotate the member 85 and shaft 72 in the same direction, on account of the rigid attachment of said projection 89 to the member 85 and the action of the slot 87 and pin 88; and the arm 76, which is rigidly attached to the shaft 72 and pivotally attached to the link 82, swings with said shaft 72 to effect a backward longitudinal movement of the link 82; and the arm 70, which is pivotally attached to the link 82 and rigidly attached to the spindle 46, effects a turning movement of said spindle 46 in a direction to cause the arm 45 to move the rod 64 toward the device 50 through the action of the hole 66 and pin 65 and the lash allowed by the lost motion slots 48 and 49, and thereby moving the valve 62 in the same direction to open the ports 52 and 53, whereupon the air in the chamber 40 is depleted by vacuum from the manifold of the engine through the following passageways: tube 54, port 51, port 52, and tube 55—42; and the atmospheric air rushes through the following passageways: tube 67, port 53 and tube 56—43 into chamber 41 to move the piston 39 toward the rear of the cylinder 38, whereby the piston rod 36 through the pin 37 swings the arm 33 in the same direction and turns the spindle 13 therewith, because of the rigid attachment of the hub 32 to the spindle 13 by the pin 34. This follow-up action of the power means will continue as the operator continues to move the lever 92, etc., to keep the valve 62 moved ahead of the ports 52 and 53, and the spindle continues likewise to turn; and, since the lug 27 has engaged the slot 28, the lever 11 is made to swing in the same direction, and the yoke 3, through the action of the link 8, shifts the gear 2 to reverse speed position.

It can here be noted that if the operator in any shifting movements elects to stop the movement of the lever 92, the valve 62 is likewise stopped, and the action of the power means will follow to cause the ports 52 and 53 to overrun the valve 62 and become closed, and thus also stop the action of the power means, because the device 50 carrying the ports 52 and 53 is secured to and controlled by the power actuated lever 33, while the action of the valve 62 is controlled by the manually operated lever 45.

To bring the gear 2 from reverse to neutral position, the parts all act in the opposite direction to that of shifting into reverse position; and the valve 62 moving in the opposite direction opens the ports 52 and 53, whereupon the air in the chamber 41 is depleted by said vacuum through the following passageways: tube 54, port 53, and tube 56—41; and the atmospheric air rushes through the following passageways: tube 67, port 52, and tube 55—42 into chamber 40 to move the piston 39 toward the front, and the connected parts acting in the said opposite direction, brings the gear 2 to neutral position.

It is clear to see that the action of shifting the gear from neutral position to low position is the same as shifting said gear 2 to neutral position from reverse speed position, and the action of returning said gear 2 from low speed position to neutral position is the same as shifting said gear 2 from neutral position to reverse speed position.

If it is desired to selectively shift into either second or high speed, the lever 92 is raised and the action of all parts to effect selection are in a direction opposite to that for making the selection as recited above, for shifting into reverse or low speed, whereby the lug 27 is caused to selectively engage the notch 29; whereupon, if the shift to effect second speed is desired, the lever 92 is swung forward and the action of all parts is the same as for shifting into reverse, except the lug 27 having been selectively engaged in the notch 29 moves the lever 18 toward the rear and the synchronizer is made to engage the second speed gear through the action of the yoke 14 and notch 17. To now bring the parts to neutral position and to high speed position, all parts act in the opposite direction, and to effect high speed position the synchronizer is made to engage the direct drive shaft 99. The action to bring the parts to neutral position from high speed position is the same as that to effect the shift into second speed position.

In the showing of the invention nothing has been shown for yieldingly holding the manual means in the neutral or shifted positions, or for so holding the valve 62 in the port closed position; but, if it is found desirable to use such means, it is understood that any known device for effecting such function or functions may be used. It is understood that the customary interlock and spring plungers are to be used to properly control the shift rails 4 and 16.

It is obvious that the required movements of the lever 92 can be changed by changing one or the other oscillating fulcrum supports 83 or 84 relatively to the opposite side of the lever 82, or by changing the direction of either of the crank arms 70 or 79 relatively to the opposite side of the respective shaft 46 or 72.

It must now be apparent that my invention obtains all of the intended objects in a highly efficient manner. Obviously, the construction, arrangement and relationship of the parts may be varied within the scope of equivalent limits without departure from the nature and principle of the invention. I do not restrict myself specifically otherwise than as set forth in the appended claims, nor do I restrict myself unessentially in any respects.

What I claim and desire to secure by Letters Patent is:

1. Gear shifting mechanism of the character described comprising a spindle, a second spindle, both of said spindles being mounted for longitudinal and rocking movements, means connecting said spindles for positive simultaneous longitudinal movements and for slight relative rotative movements, a valve mounted on said connecting means, a manual device connected to said second spindle and to said valve for regulating said valve and also for operating said spindles, and a power means controlled by said valve for assisting said manual device in operating said first named spindle.

2. Gear shifting mechanism of the character described comprising shifter elements, an actuator mounted for longitudinal and turning movements for selectively shifting said elements, a spindle, means connecting said actuator and spindle for simultaneous longitudinal movements and for slight relative turning movements, a shaft mounted for longitudinal and turning movements, a lever and link device connecting said shaft to said spindle for imparting longitudinal and turning movements respectively to said spindle and said actuator by said shaft, a valve mounted on said connecting means, manual means for regulating said valve and also for operating said shaft, and a power means connected to said actuator and controlled by said valve for assisting said manual means in rocking said actuator.

3. Gear shifting mechanism of the character described comprising shifter elements, an actuator mounted for longitudinal selective movements and rotative shifting movements for selectively shifting said elements, a spindle for moving said actuator, means providing a positive longitudinal connection and also providing a lost motion rotative connection between said spindle and said actuator, a valve mounted on said means, manually operated means connected to said spindle and to said valve for regulating said valve and also for moving said spindle, and a power means connected to said actuator and controlled by said valve for assisting said manual means in effecting said shifting movements.

4. Gear shifting mechanism of the character described comprising shifter elements, a shaft mounted for longitudinal and turning movements, means operatively connected to said shaft for selectively shifting said elements by said shaft, a member supported for turning movements only, means connecting said shaft and said member for turning said shaft by said member but not effecting longitudinal movements of said shaft, an operating lever connected to said member and engaging said shaft for moving said shaft longitudinally and also for turning said member and thereby said shaft, and a power means connected to said first named means and controlled by said shaft for assisting said shaft in shifting said elements.

5. Gear shifting mechanism of the character described comprising shifter elements, an actuator selectively engageable for shifting said elements, a power device for imparting shifting movements to said actuator, a valve for controlling energization of said power device, a shaft mounted for longitudinal and rocking movements, a member supported for rocking movements only, means cooperating with said shaft and said member for holding said shaft and said member against relative rotative movements, an operating lever pivotally connected to said member and said shaft for turning said shaft by said member and also for moving said shaft longitudinally, and a link connecting said shaft to said actuator and also to said valve in a manner for selectively positioning said actuator by longitudinal movements of said shaft and thereafter operating said valve and also assisting said power device to move said actuator to shift the selected element by rotative movements of said shaft.

6. Gear shifting mechanism of the character described comprising shifter elements, actuating means for selectively shifting said elements, a crank arm attached to said actuating means, a power device for imparting shifting movements to said actuating means to shift the selected element, means including a valve seat mounted entirely upon and bodily movable with said crank arm, a valve plate mounted upon said valve seat and movable relative thereto for controlling energization of said power device, and operating means connected in a manner for manually positioning said actuating means selectively and also for regulating said valve.

7. Gear shifting mechanism of the character described comprising shifter elements, actuating means for selectively shifting said elements, a crank arm attached to said actuating means, a power device for imparting shifting movements to said actuating means to shift the selected element, means including a valve seat mounted entirely upon and bodily movable with said crank arm, a valve plate mounted upon said valve seat and movable relative thereto for controlling energization of said power device, and operating means connected in a manner for manually positioning said actuating means selectively and also for regulating said valve and thereafter assisting said power device to move said actuating means to shift the selected element.

8. Gear shifting mechanism of the character described comprising a spindle, a second spindle, means connecting said spindles for positive simultaneous longitudinal movements and for limited relative rotative movements, a valve mounted on said means, a manual device connected to said second spindle and to said valve for regulating said valve and also for operating said spindles, and a power means connected to said first named means and controlled by said valve for assisting said manual device to rotate said first named spindle.

9. Gear shifting mechanism of the character described comprising selective shifter elements, a pair of spindles mounted in axial alinement for selectively engaging and shifting said elements by longitudinal and rotative movements thereof respectively, means providing positive simultaneous longitudinal movements and limited relative rotative movements of said spindles, a valve mounted on said means, manual means connected to one of said spindles and to said valve for regulating said valve and also for operating said spindles, and a power device connected to said first named means and controlled by said valve for assisting said manual means to shift the selected element.

10. Gear shifting mechanism of the character described comprising selective shifter elements, a spindle mounted for longitudinal movements to selectively engage said elements and for rotative movements to shift the selected element, a power device for imparting shifting movements to said spindle, a valve for controlling energization of said power device, a shaft mounted in axial alinement with said spindle, means connecting said shaft and said spindle providing positive simultaneous longitudinal movements thereof and limited relative rotative movements therebetween, and manual means for operating said shaft to selectively position said spindle and to regulate said valve and thereafter to assist said power device to impart shifting movements to said spindle.

11. Gear shifting mechanism of the character described comprising shifter elements, an actuator mounted for longitudinal selective movements and rotative shifting movements for selectively shifting said elements, a spindle, means providing a positive longitudinal connection and also providing a lost motion rotative connection between said spindle and said actuator, a valve mounted on said means, manually operated means connected to said spindle and to said valve for regulating said valve and also for moving said spindle, and a power means connected to said first named means and controlled by said valve for effecting said shifting movements.

12. Gear shifting mechanism of the character described comprising selective shifter elements, a spindle mounted for longitudinal movements to selectively engage said elements and for rotative movements to shift the selected elements, a power device for imparting shifting movements to said spindle, a valve for controlling energization of said power device, a shaft mounted in axial alinement with said spindle, means connecting said shaft and said spindle providing positive simultaneous longitudinal movements thereof and limited relative rotative movements therebetween, and manual means for operating said shaft to selectively position said spindle and to regulate said valve, whereupon said power device imparts shifting movement to said spindle.

13. Gear shifting mechanism of the character described comprising a rockable shaft, a crank arm attached to said shaft, a power device for swinging said crank arm and rocking said shaft as desired, a valve mechanism for controlling energization of said power device, one element of said valve mechanism rigidly supported by said crank arm and positively movable therewith, a second element of said valve mechanism supported by said one element and relatively movable thereto, and operating means connected to said second element for regulating said valve mechanism.

14. Gear shifting mechanism of the character described comprising a rockable shaft, a crank arm attached to said shaft, a power device for swinging said crank arm and rocking said shaft as desired, a valve mechanism for controlling energization of said power device, one element of said valve mechanism supported by said crank arm and positively movable therewith, a second element of said valve mechanism supported by said crank arm and relatively movable thereto for regulating said valve mechanism, a member pivotally supported by said shaft for moving said second element, and operating means for operating said member.

15. Gear shifting mechanism of the character described comprising an actuator including a crank arm, a power device for moving said crank arm and actuator as desired, a valve seat made rigid with said crank arm, a valve plate mounted on said seat and relatively movable thereto for controlling energization of said power device, a lever pivotally supported by said actuator for moving said valve plate as aforesaid, and operating means for moving said lever.

16. Gear shifting mechanism of the character described comprising an actuator, a crank arm connected to said actuator for turning said actuator, a power device connected to said crank arm for imparting movements thereto, a valve entirely supported by said crank arm and having a part movable relative to said arm for controlling energization of said power device, and operating means connected to said valve for moving said valve.

17. Gear shifting mechanism of the character described comprising a shifter element, an actuator including crank means movable for shifting said element, a power device for imparting shifting movements to said crank means, a valve seat rigid with said crank means, a valve plate mounted on said valve seat for relative movements thereto for controlling energization of said power device, a support, a member pivotally mounted on said actuator and in said support and having a crank arm for moving said valve plate as aforesaid, a lost motion means for limiting relative movements between said crank means and said crank arm, and operating means connected to said member for moving said crank arm.

18. Gear shifting mechanism of the character described comprising a shifter element, an actuator including crank means movable for shifting said element, a power device for imparting shifting movements to said actuator and crank means, a valve seat rigid with said crank means, a valve plate mounted on said valve seat for relative movements thereto for controlling energization of said power device, a support, a member rotatively mounted on said actuator and said support and having a crank arm for moving said valve plate as aforesaid, a lost motion means for limiting relative movements between said member and said actuator, and operating means connected to said member for moving said member and thereafter assist said power device to impart shifting movements to said actuator as desired.

19. Gear shifting mechanism of the character described comprising a shifter element, an actuator including crank means movable for shifting said element, a power device connected to said crank means for imparting shifting movements to said actuator, a valve mounted on said crank means for controlling energization of said power device, a support, a lever means connected to said valve and pivotally mounted on said actuator and support for regulating said valve, a lost motion device for limiting the respective movements between said actuator and said lever means, and operating means for moving said lever means to regulate said valve and also finally assist said power device to impart shifting movements to said actuator as desired.

20. Gear shifting mechanism of the character described comprising a shaft, an arm rigidly supported by said shaft for turning said shaft, a second arm pivotally supported by said shaft for swinging movements, lost motion means entirely supported by said arms for limiting relative swinging movements between said arms, manual means connected to said second arm for manually operating said arms, and a power device controlled by said second arm for assisting said manual means in operating said first named arm.

21. Gear shifting mechanism of the character described comprising a shifter element, a shaft mounted for turning movement to shift said element, an arm rigidly supported by said shaft for turning said shaft, a second arm pivotally supported by said shaft for swinging movements, lost motion means entirely supported by said arms for limiting relative swinging movements between said arms, manual means connected to said second arm for manually operating said arms, and a power device controlled by said second arm for assisting said manual means in operating said first named arm.

22. Gear shifting mechanism of the character described comprising an actuator, a crank arm connected to said actuator for turning the same, a power device for actuating said crank arm to turn said actuator, conduits for transmitting fluid energy to said power device, valve means including a valve seat rigidly supported by said crank arm and movable therewith and a valve plate mounted on said valve seat for relative movement thereto to open and close said valve means to control operation of said power device by fluid energy passing through said conduits, and manual operating means for moving said valve plate to regulate said valve means while said movement of said valve seat is responsive to the operation of said power device.

23. Gear shifting mechanism of the character described comprising a shaft, an arm rigidly supported by said shaft for turning the same, a second arm pivotally supported by said shaft for swinging movements, lost motion means entirely supported by said arms for limiting relative swinging movements between said arms, a power device, conduits for conducting fluid energy to said power device, a valve regulated by said second arm for controlling operation of said power device by said fluid energy passing through said conduits, and manual means connected to said second arm for operating said second arm.

24. Gear shifting mechanism of the character described comprising a shaft, an arm rigidly supported by said shaft for turning the same, a second arm pivotally supported by said shaft for swinging movements, lost motion means entirely supported by said arms for limiting relative swinging movements between said arms, a power device, conduits for conducting fluid energy to said power device, a valve regulated by said second arm for controlling operation of said power device by said fluid energy passing through said conduits, and manual means connected to said second arm for manually operating said arms, said power device being controlled by said valve for assisting said manual means in operating said first named arm.

25. Gear shifting mechanism comprising two axially alined spindles supported for longitudinal and rocking movements, elements connecting said spindles for turning and imparting longitudinal movements to one by the other and leaving said spindles free for slight relative turning movements, a manual device connected to one of said spindles for turning and moving the same longitudinally, power mechanism for assisting said manual device in operating said spindles, and a valve operated by said connecting elements controlling energization of said power mechanism.

26. Gear shifting mechanism of the character described comprising a shaft mounted for turning movements, an arm rigidly supported by said shaft, a second arm supported by said shaft for swinging movements, lost motion means entirely supported by said arms for limiting relative swinging movements between said arms, manual means connected to said second arm for manually operating said arms and thereby said shaft, and a power device controlled by said second arm for assisting said manual means in operating said first named arm and thereby said shaft.

27. Gear shifting mechanism of the character described comprising shifter means, a shaft mounted for turning movements to shift said means, an arm rigidly supported by said shaft, a second arm pivotally supported by said shaft for swinging movements, a power device connected for operating said first named arm and thereby said shaft, means supported by said arms for limiting relative swinging movements between said arms, conduits for transmitting fluid energy to said power device, a valve connected to and regulated by said second arm for controlling energization of said power device by said fluid energy passing through said conduits, and operating means connected to said second arm for regulating said valve to control operation of said power device by said fluid energy and thereby operate said shaft and said first named arm as aforesaid.

28. Gear shifting mechanism of the character described comprising shifter means, a shaft mounted for turning movements to shift said means, an arm rigidly supported by said shaft, a second arm pivotally supported by said shaft for swinging movements, a power device connected for operating said first named arm and thereby said shaft, means supported by said arms for limiting relative swinging movements between said arms, conduits for transmitting fluid energy to said power device, a valve connected to and regulated by said second arm for controlling energization of said power device by said fluid energy passing through said conduits, and operating means connected to said second arm for regulating said valve to control operation of said power device by said fluid energy and also assist said power device in operating said shaft and said first named arm as aforesaid.

29. Gear shifting mechanism of the character described comprising shifter means, a shaft mounted for turning movements to shift said means, an arm rigidly supported by said shaft, a second arm pivotally supported by said shaft for swinging movements, a power device connected for operating said first named arm and thereby said shaft, means supported by said arms for limiting relative swinging movements between said arms, conduits for transmitting fluid energy to said power device, a valve connected to and regulated by said second arm for controlling energization of said power device by said fluid energy passing through said conduits, and operating means connected to said second arm for regulating said valve to control operation of said power device by said fluid energy and also assist said power device in operating said shaft and said first named arm as aforesaid or effect complete shifting operation of said shifter means when said power device becomes ineffective.

30. Gear shifting mechanism of the character described comprising a shaft mounted for turning movements, an arm rigidly supported by said shaft, a power device connected for operating said shaft and said arm, conduits for transmitting fluid energy to said power device, valve means including a valve seat rigidly supported by said arm and movable therewith and a valve plate mounted on said valve seat for relative movements thereto to open and close said valve means for controlling operation of said power device by said fluid energy passing through said conduits, and operating means for moving said valve plate to regulate said valve means and leaving said valve seat responsive to the operation of said power device.

31. Gear shifting mechanism of the character described comprising an arm mounted for swinging movements, a manually movable element, a second arm supported by said element for swinging movements, interengaging parts directly supported by said arms for limiting relative swinging movements between said arms, manual means conencted to said second arm for manually operating said arms, and a power device controlled by said second arm for assisting said manual means in operating said first named arm.

32. Gear shifting mechanism of the character described comprising a rock shaft, a crank arm attached to said shaft, a power device for swinging said crank arm and rocking said shaft as desired, a valve seat mounted on and entirely supported by said crank arm, a valve plate mounted on said valve seat and movable relative thereto, and operating means connected to said valve plate for moving the same relative to said valve seat and regulating the valve comprising said valve seat and said valve plate.

ELMER G. KESLING.